Feb. 10, 1925.

J. BATH 1,525,491

ADJUSTABLE BLOCK GAUGE

Filed May 6, 1920

Inventor.
John Bath
By Attorneys
Southgate & Southgate

Feb. 10, 1925.
J. BATH
ADJUSTABLE BLOCK GAUGE
Filed May 6, 1920  2 Sheets-Sheet 2
1,525,491
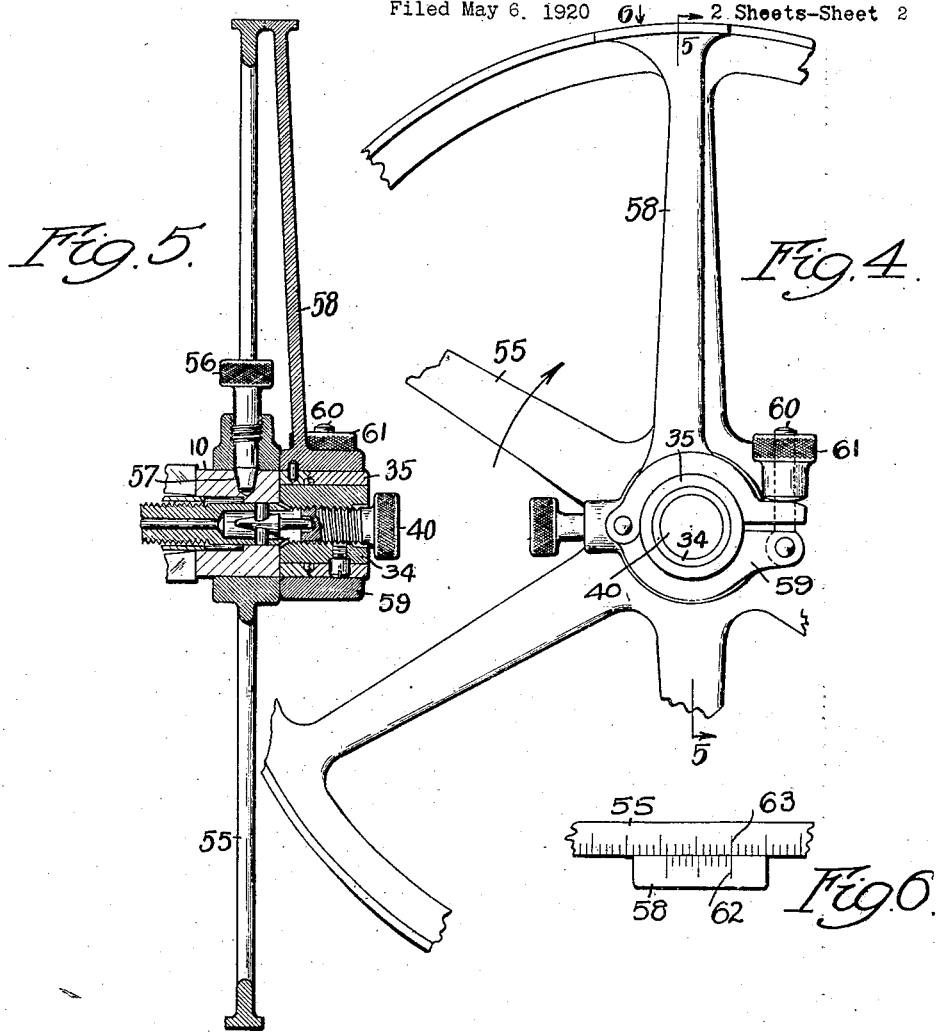
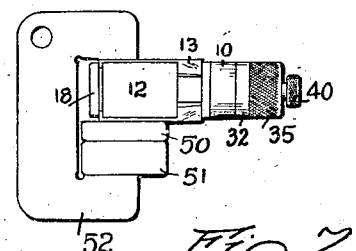
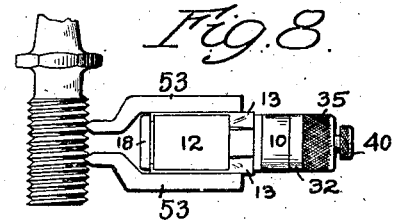
Inventor
John Bath
By attorneys
Southgate & Southgate Patented Feb. 10, 1925.

1,525,491

UNITED STATES PATENT OFFICE.

JOHN BATH, OF WORCESTER, MASSACHUSETTS, ASSIGNOR TO JOHN BATH & CO. INC., OF WORCESTER, MASSACHUSETTS, A CORPORATION OF MASSACHUSETTS.

ADJUSTABLE BLOCK GAUGE.

Application filed May 6, 1920. Serial No. 379,399.

*To all whom it may concern:*

Be it known that I, JOHN BATH, a citizen of the United States, residing at Worcester, county of Worcester, State of Massachusetts, have invented a new and useful Adjustable Block Gauge, of which the following is a specification.

This invention relates to an adjustable block gauge particularly designed for use with a series of metal blocks of different standard thicknesses for building up any desired dimension. Such standard blocks are in common use and a very complete range of sizes may be obtained by providing a sufficiently large number of blocks. For instance, a set of eighty-one standard blocks will furnish combinations giving any size from one tenth of an inch to ten inches, increasing by steps to one ten-thousandth of an inch each.

It is the object of my invention to provide an adjustable block gauge for use in combination with a greatly reduced number of blocks to give even greater range and finer sub-divisions.

With this object in view, I provide an adjustable gauge of the general type shown in my prior application, Ser. No. 351,686 filed April 15, 1920, but embodying changes and improvements therein adapting the gauge to use as a block gauge. The four curved-face gauge bars of the adjustable gauge are replaced by two gauge bars having broad flat parallel faces finished to mirror-like surfaces. By using the gauge adjustment for small variations, ten standard blocks with the gauge will give any size from one inch to twelve inches and the readings may be easily carried to one one-hundred-thousandths of an inch or less.

A further feature of my invention relates to the provision of an adjustable index or zero mark cooperating with graduations on the gauge bars.

Another feature relates to the provision of improved devices permitting extremely fine readings of the gauge adjustment.

My invention further relates to arrangements and combinations of parts which will be hereinafter described and more particularly pointed out in the appended claims.

A preferred form of my invention is shown in the drawings, in which—

Fig. 4 is a partial right-hand end elevation, showing the attachment for close readings;

Fig. 5 is a vertical sectional view taken along the line 5—5 in Fig. 4;

Fig. 6 is a detail plan view looking in the direction of the arrow 6 in Fig. 4, and Figs. 7 and 8 are views showing two applications of my invention.

Figure 1:
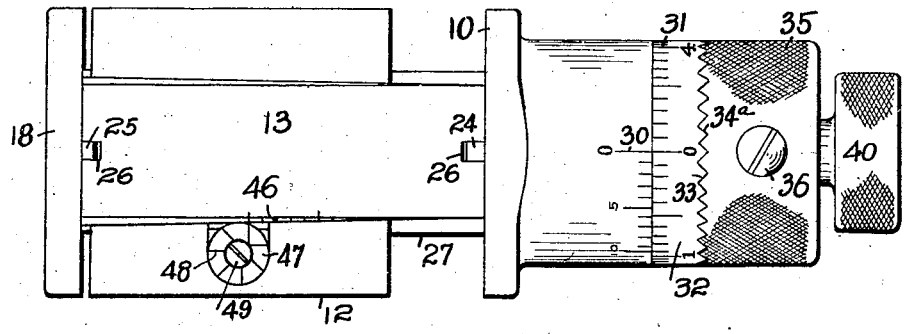
Fig. 1 is a plan view of my improved gauge.
Figure 2:
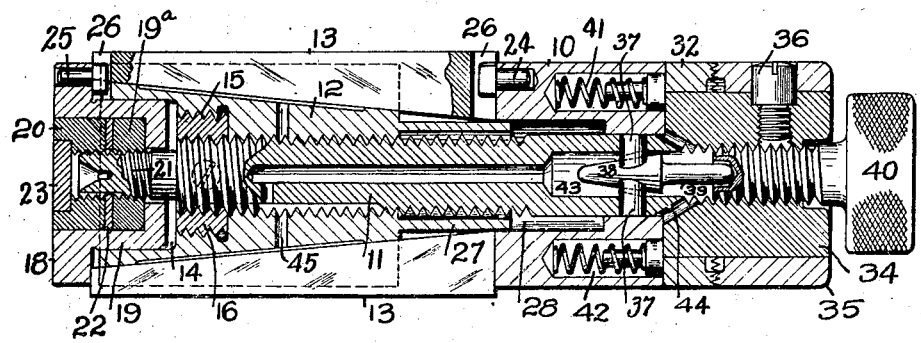
Fig. 2 is a vertical sectional view thereof.
Figure 3:
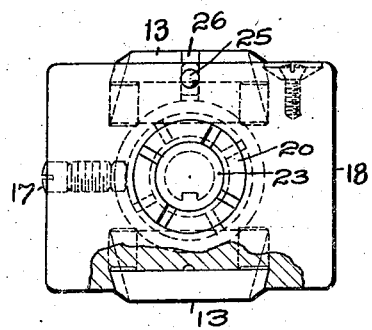
Fig. 3 is a left-hand end elevation thereof.

Referring to Figs. 1, 2 and 3, I have shown my improved adjustable block gauge as comprising a body 10, within which a threaded shaft 11 is mounted for free angular movement. A member 12 is mounted on the threaded portion of the shaft 11 and is longitudinally movable thereby relative to the body 10. The member 12 is provided with oppositely disposed dove-tailed guideways inclined to the axis of the gauge and adapted to receive gauge bars 13 closely fitting said guideways which permit relative longitudinal movement only between said member and said bars. The member 12 is provided with a recess 14 at its left-hand end, as viewed in Fig. 2, and also with a threaded recess 15 of reduced diameter.

A sleeve 16 is threaded externally to fit the recess 15 and is also threaded internally to fit the shaft 12. A binding screw 17 (Fig. 3) constitutes means for locking the sleeve 15 in adjusted position in the member 12. The sleeve 16 is provided with slots for a spanner or screw driver and may thus be readily adjusted to eliminate all back lash between the member 12 and the shaft 11.

An end plate 18 is provided with a hub or cylindrical projection 19 extending into the recess 14 and closely fitting therein. The plate 18 is adjustably secured to the end of the shaft 11 by a nut $19^a$ and binding nut 20, both fitting the reduced end 21 of the shaft 11.

A washer 22 is preferably provided between the nuts $19^a$ and 20, the washer being keyed to the threaded portion 21 and assuring rotation of the nuts $19^a$ and 20 with the shaft 11. The shaft 11 is commonly provided with a center hole in the portion 21, which may be protected from dirt and injury by sealing the opening in the nut 20 by a suitable closure 23.

Headed studs 24 and 25 are mounted in the body 10 and plate 18, and project into slots 26 extending transversely through the ends of one of the gauge bars 13. These studs and slots permit outward or inward movement of the gauge bars but prevent rotation thereof with the shaft 11. The member 12 has an extension or hub 27 extending into a recess 28 in the body 10. The construction of the member 12 is such that the threaded shaft 11 is fully protected from dirt or injury in every position thereof.

The body 10 is provided with graduations 30 (Fig. 1) which may be of the vernier type and cooperate with graduations 31 on a ring 32 having teeth 33 in one edge thereof. The ring 32 is loosely mounted on the enlarged head 34 of the threaded shaft 11 and the ring teeth 33 cooperate with corresponding teeth 34 on the adjacent end of a sleeve 35 fixed to the head 34 by a screw 36.

After the gauge bars 13 are brought to an exact standard size, the screw 36 may be temporarily removed, permitting the sleeve 35 to be moved to the right to release the ring 32. This ring may then be rotated to the exact desired reading, after which the sleeve 35 will be restored to its normal position, engaging and locking the ring 32.

It is sometimes desirable to preserve a gauge setting and prevent rotation of the shaft 11. For this purpose blocks 37 are mounted to slide in a recess extending transversely through the shaft 11, the blocks having tapered concave inner faces fitting a conical plunger 38 having an extension 39 seated in a recess in the inner end of an adjusting screw 40. When the screw 40 is turned inward the plunger 38 forces the blocks 37 apart to engage the inner surfaces of the body 10, thus holding the shaft 11 from rotation.

A pair of spring plungers 41 are mounted in recesses 42 in the body 10 and yieldingly engage the head 34 and ring 32. These plungers provide uniform resistance to the turning of the shaft 11. An oil chamber 43 is formed within the shaft 11 and communicates by suitable passages 44 and 45 with all of the important bearing surfaces. The chamber is closed by the screw 40.

One of the gauge bars 13 is provided with graduations 46 (Fig. 1) cooperating with a zero or index mark on the member 12. As the gauge bars eventually wear small, it is necessary to adjust the zero mark. For this purpose, I provide a round plate 47 having a plurality of index lines 48 thereon. One of these these lines is preferably radial and and the other lines are parallel to different radii but disposed at different distances to one side thereof. The plate 47 is held fixed in position by a binding screw 49. By loosening the binding screw and turning the plate 47, the index line may be gradually moved toward the right as the gauge bars are reduced in thickness by wear and redressing. The gauge bars 13 are provided with flat and relatively broad outer gauging surfaces, as clearly shown in Figs. 1 and 3, these surfaces being exactly parallel to each other and being highly finished so that a gauge block of standard thickness may be caused to adhere thereto by rubbing the block against the gauge bar, this method of causing highly polished surfaces to adhere being well known in the measurement art.

In Figs. 7 and 8, I have indicated two applications of my invention. In Fig. 7 the block gauge is used in combination with standard blocks 50 and 51 to determine the exact inside diameter of the snap gauge 52. In Fig. 8 offset thread engaging bars 53 are mounted on the flat faces of the block gauge and constitute a thread gauge, the points of the bars being known distances within the faces of the block gauge. Many other applications of the gauge will be apparent to those skilled in the art.

The graduations 31 on the ring 32 indicate ten-thousandths of an inch and when read by the vernier in connection with the index line 30, a reading to one hundred-thousandth may be obtained. Under some conditions, an even finer graduation may be desired and for this purpose I mount a light wheel or disc 55 on the body 10, fixing the same in position thereon by a lock screw 56, the conical point of which extends into a corresponding recess 57 in the body 10. An arm 58 having a split hub 59 is mounted on the rings 32 and 35 which in turn are fixed to the head 34 of the shaft 11. Relative rotation of the arm 58 and ring 32 may be prevented by a pin locking the two together as indicated in Fig. 5. A screw 60 and nut 61 provide means for binding the split hub 59 firmly to the rings 32 and 35. As the shaft 11 is thereafter rotated to adjust the gauge; a greatly magnified reading of the adjustment may be obtained by the use of vernier graduations 62 on the end of the arm 58 in cooperation with graduations 63 on the rim of the wheel 55. The movement of the gauge bars 13 is thus magnified so that readings as fine as one millionth of an inch may be indicated, such readings being sometimes desirable for purposes of comparison.

Having thus described my improved adjustable block gauge, it will be seen that the gauge, while commonly having a range of adjustment of only five or six one-hundredths of an inch, nevertheless very greatly reduces the number of standard blocks necessary to make up any desired combination, as only the larger elements of the dimension need be furnished by the blocks, all small variations being taken care of by adjustment of the gauge.

My improved gauge also possesses the important advantage that differences in size may be quickly and directly determined thereby without using the "cut and try" method of building up a series of different block combinations.

It is obvious that one of the gauge bars may be omitted reducing the range of adjustment but retaining many of the advantages of the preferred form. The flat lower surfaces of the end plate 18 (Fig. 3) and of the flanged end of the body 10 then determine the lower gauging surface.

Having thus described my invention, it will be evident that other changes and modifications can be made therein by those skilled in the art within the spirit and scope of my invention as set forth in the claims, and I do not wish to be otherwise limited to the details herein disclosed, but what I claim is:—

1. An adjustable block gauge comprising an elongated body, a member mounted for longitudinal movement relative thereto and having a guideway inclined to the direction of movement of said member, a tapered gauge bar fitting said guideway, and held from longitudinal and angular movement relative to said body, and means to move said member longitudinally of said body, said gauge bar having a flat relatively broad outer surface to which a flat metal block may be caused to adhere by rubbing thereon.

2. An adjustable block gauge comprising an elongated body, a member mounted for longitudinal movement relative thereto and having guideways inclined to the direction of movement of said member, a pair of tapered gauge bars fitting said guide ways and held from longitudinal and angular movement relative to said body, and means to move said member longitudinally of said body, said gauge bars having parallel, flat, relatively broad outer surfaces to which flat metal gauge blocks may be caused to adhere by rubbing thereon.

3. An adjustable gauge comprising an elongated body, a member mounted for longitudinal movement relative thereto, and having a guideway inclined to the direction of movement of said member, a tapered gauge bar fitting said guideway and held from longitudinal movement relative to said body, and means to move said member longitudinally of said body, said bar having graduations thereon and said member having a plate rotatably mounted thereon adjacent to said graduations, said plate having index marks each parallel to a radius thereof but placed at different positions laterally relative to the parallel radius, means being also provided to clamp said plate in adjusted angular position.

4. An adjustable gauge comprising an elongated body, a member mounted for longitudinal movement relative thereto, and having a guideway inclined to the direction of movement of said member therein, a tapered gauge bar fitting said guideway and held from longitudinal and angular movement relative to said body, and a threaded shaft mounted in said body for angular movement only and effective to move said member longitudinally of said body, said shaft and body having a graduated wheel mounted on one of said parts and an index arm mounted on the other part cooperating with said wheel to indicate changes in gauge adjustment.

5. An adjustable gauge comprising an elongated body, a member mounted for longitudinal movement relative thereto and having a guideway inclined to the direction of movement of said member, a tapered gauge bar fitting said guideway and held from longitudinal and angular movement relative to said body, and means to move said member longitudinally of said body, said means comprising a threaded shaft having a bearing in said body and friction devices mounted in said body and engaging said shaft to furnish uniform resistance to rotation thereof.

6. An adjustable gauge comprising an elongated body, a member mounted for longitudinal movement and having a guideway inclined to the direction of movement of said member, a tapered gauge bar fitting said guideway and held from longitudinal movement relative to said body, and means to move said member longitudinally of said body, said means comprising a threaded shaft having a head and said body being provided with spring plungers pressed outward against said head to uniformly resist rotation of said shaft.

7. An adjustable block gauge comprising an elongated body, a member mounted for longitudinal movement relative thereto and having guideways inclined to the direction of movement of said member, tapered gauge bars fitting said guideways and held from longitudinal and angular movement relative to said body, said bars having flat relatively broad outer faces, means to move said member longitudinally of said body to adjust said bars transversely, and a pair of thread-engaging bars having broad flat inner faces adapted to adhere to said gauge bars when rubbed thereon, the points of said thread-engaging bars being off-set at known distances from the flat inner faces thereof.

In testimony whereof I have hereunto affixed my signature.

JOHN BATH.